June 12, 1956
W. T. GREENWAY
2,750,207
LONGITUDINALLY ADJUSTABLE FIFTH WHEEL
CONSTRUCTION FOR SEMITRAILERS
Filed June 8, 1954
3 Sheets-Sheet 2
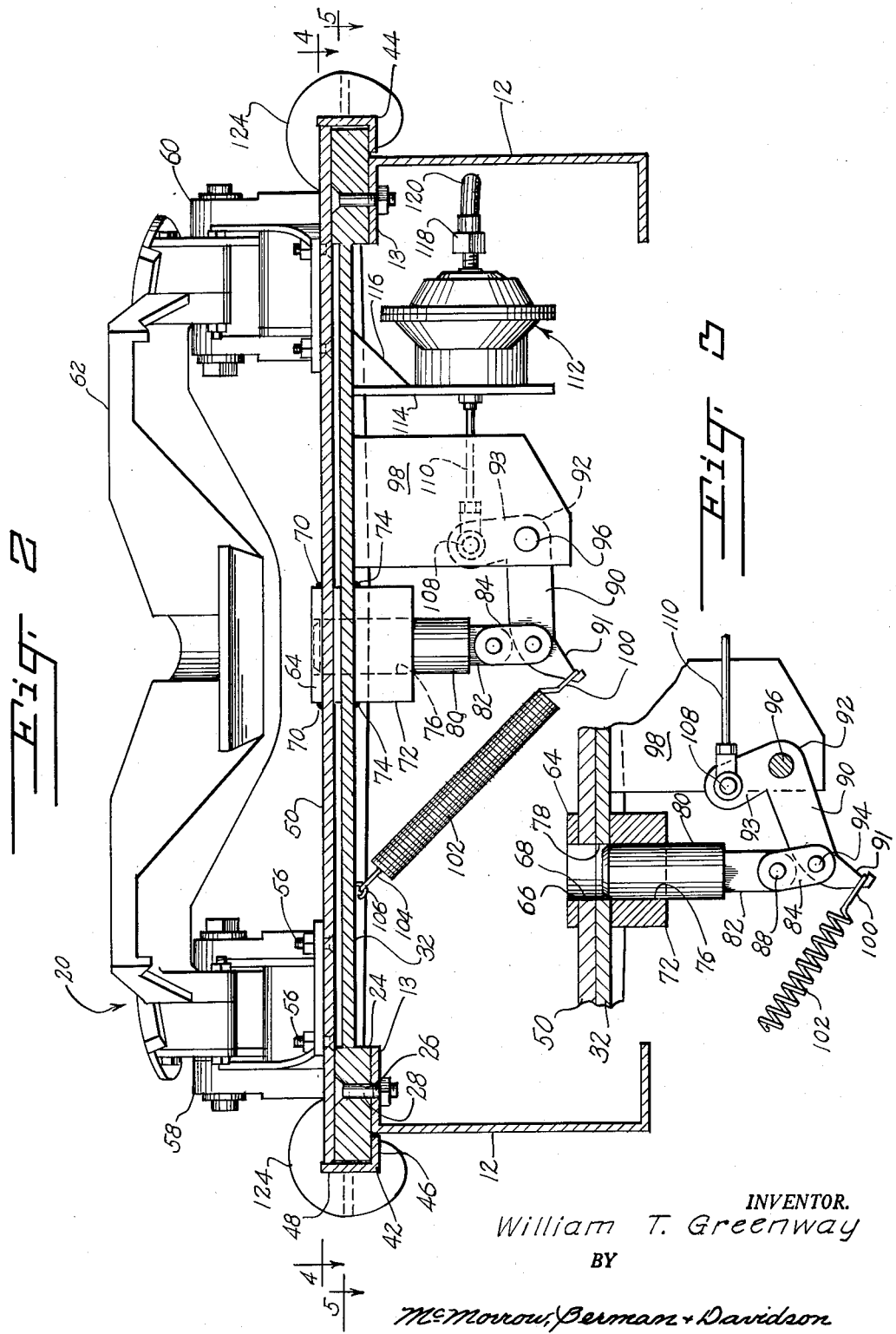
INVENTOR.
William T. Greenway
BY
McMorrow, Berman + Davidson
ATTORNEYS

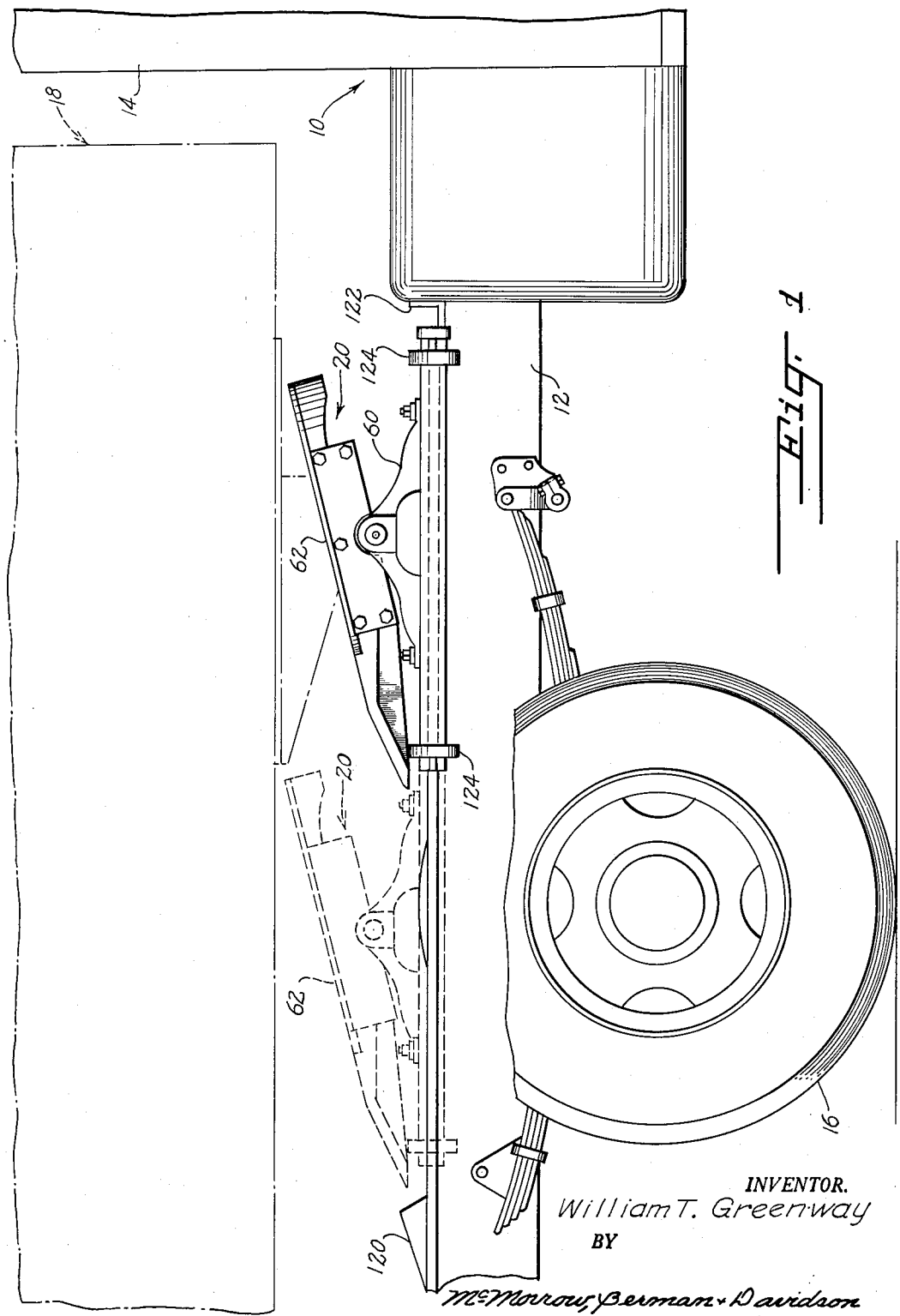

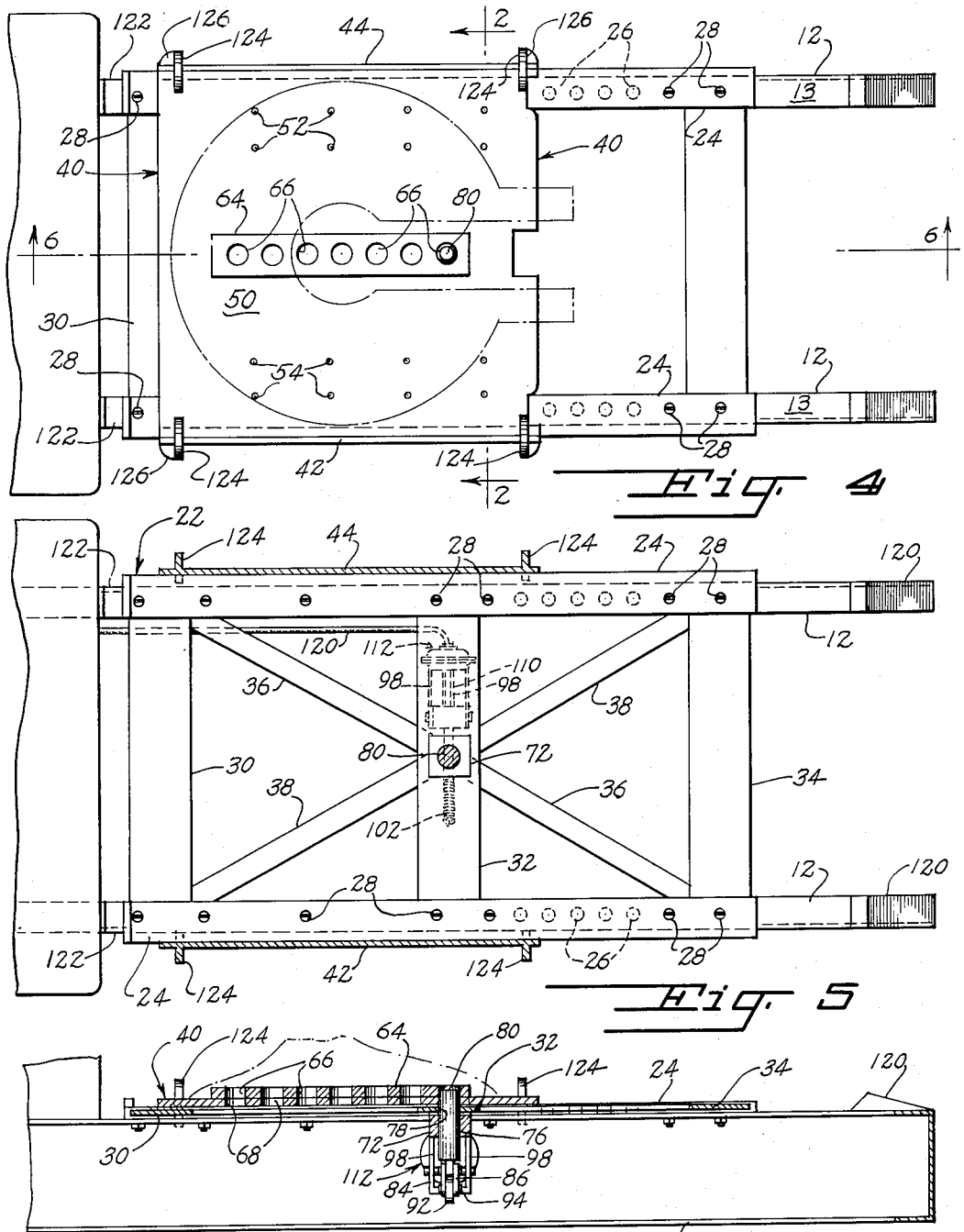

United States Patent Office 2,750,207
Patented June 12, 1956

2,750,207

LONGITUDINALLY ADJUSTABLE FIFTH WHEEL CONSTRUCTION FOR SEMITRAILERS

William T. Greenway, Borger, Tex.

Application June 8, 1954, Serial No. 435,184

5 Claims. (Cl. 280—407)

This invention relates to trailer trucks, and more particularly to fifth wheel coupling construction therefor.

It is an object of this invention to provide the fifth wheel construction for trailer trucks to which a trailer may be detachably connected, the fifth wheel being selectively movable longitudinally of the truck frame upon which it is mounted, so as to bring the fifth wheel closer to or move it farther away from the cab of the trailer truck and thereby increase or decrease the over-all length of the semitrailer unit.

It is another object of this invention to provide a fifth wheel construction for trailer trucks which may be selectively unlocked to permit adjustment thereof, so as to increase or decrease the over-all length of the trailer truck with the trailer attached to the fifth wheel thereof.

Yet another object of this invention is to provide a simple yet rugged fifth wheel construction which may be readily incorporated into existing trailer truck structures at a nominal cost, so as to provide selective adjustment of the over-all length of the semitrailer unit consisting of a trailer truck and the attached trailer, and which may be operated by the driver from the interior of the cab of the trailer truck.

Another and still further object of this invention is to provide a fifth wheel construction which may be selectively moved longitudinally of the trailer truck frame upon which it is mounted to any one of a number of selected positions and locked in the selected position. Also, the fifth wheel construction may be moved from any one of the selected positions to any of the other selected positions at the option of the operator without the necessity of the operator leaving the cab of the trailer truck.

Other objects and advantages will become apparent from a consideration of the following detailed description, forming the specification, and taken in conjunction with the accompanying drawings, in which:

Figure 1 is a fragmentary side elevational view of the rear portion of a trailer truck showing the fifth wheel construction embodying this invention and a trailer, in broken lines, mounted thereon;

Figure 2 is a vertical transverse cross sectional view taken substantially on line 2—2 of Figure 4;

Figure 3 is a fragmentary cross sectional view, on a somewhat enlarged scale, of the locking means and lock release means as shown in Figure 2;

Figure 4 is a sectional view taken substantially along the line 4—4 of Figure 2;

Figure 5 is a sectional view taken along the line 5—5 of Figure 2; and

Figure 6 is a longitudinal cross sectional view taken substantially on the line 6—6 of Figure 4.

With continued reference to the drawings there is shown the rear portion of a trailer truck, generally indicated at 10, provided with the usual longitudinally extending, horizontally disposed frame members 12 constituting the supporting frame for the trailer truck, and extending rearwardly from the cab 14 over the rear wheels 16 of the truck 10. A trailer, generally indicated at 18, and shown in broken lines in Figure 1, is detachably secured to the trailer truck 10 through a fifth wheel construction, generally indicated at 20.

The mounting or base plate, generally indicated at 22, is fixedly carried by the rear portion of the vehicle frame and extends across the frame members 12 thereof and longitudinally superimposed thereon for a portion of the length of the frame members 12 extending rearwardly from the cab 14.

The mounting or base plate 22 comprises a pair of spaced parallel side members 24 in the form of flat elongated, generally rectangular metal plates, each of the side members having a plurality of longitudinally spaced openings 26 transversely therethrough, which are countersunk at the end thereof opening to the top of the members 24 to receive therein bolts 28 passing through aligned apertures in the top flange 13 of each of the respective frame members 12, whereby the side members may be fixedly secured upon the trailer truck frame. Cross members 30, 32 and 34 extend between the side members 24 and are secured thereto at their respective ends, the cross members extending in spaced parallel relation with the members 30 and 34 being disposed adjacent opposite ends of the side members and the cross member 32 extending between the side members at approximately their mid-points. A pair of reinforcing bars 36 and 38 extend diagonally across the mounting plate 22 from opposite interior corners thereof and cross at the mid-point of the mounting plate, which is also the mid-point of the cross member 32.

A supporting plate, generally indicated at 40, is shown as being generally square in outline, and of lesser longitudinal dimension than the base or mounting plate 22, is superimposed upon the mounting plate and mounted thereon for sliding movement longitudinally thereof.

The supporting plate 40 includes a pair of L-shaped channels 42 and 44, extending longitudinally thereof along opposite longitudinal edges and depending therefrom with the lower leg 46 of each of the channels directed inwardly toward each other and underlying the bottom surface of the side members 24 with the upstanding leg 48 being welded, or otherwise secured, adjacent its top and remote from the leg 46 to the respective longitudinal edge of the supporting plate 40 and being slightly spaced from the adjacent longitudinal edge of the respective side members 24 of the mounting or base plate 22. Thus, the channels 42 and 44 define rails or guides for the supporting plate 40 in its movement longitudinally of the mounting or base plate 22. The body 50 of the supporting plate 40 is provided with a plurality of pairs of longitudinally spaced apertures 52 and 54 therethrough, each of the apertures having the end thereof opening to the lower face of the body 50 countersunk, so as to receive the heads of the bolts 56 therein which bolts pass through suitable openings in the base of the fifth wheel bearing supports 58 and 60 upon which the fifth wheel 62 is rotatably mounted, the bearing supports and fifth wheel construction being of the usual type.

Thus, the fifth wheel 62 is carried by the supporting plate 40 and will move therewith as the supporting plate is moved longitudinally of the mounting or base plate 22.

A retaining bar 64, in the form of an elongated flat relatively narrow, solid piece of metal material, extends longitudinally of the supporting plate 40 along its longitudinal center line from a location spaced from opposite transverse edges of the supporting plate, as clearly shown in Figure 4. The retaining bar 64 is provided with a plurality of longitudinally spaced openings 66 therethrough which are in register with similar openings 68 spaced longitudinally along the center line of the supporting plate 40. The retaining bar 64 may be secured to the supporting plate 40 as by being welded thereto as at 70. A bearing guide block 72 is welded to the lower surface of the crossbar 32, as at 74, at the mid-point location thereof, and depending therefrom. The guide block 72 is provided with a central bore 76 vertically therethrough which is in register with an opening 78 through the cross member 32.

From the foregoing, it will be seen that the supporting plate 40 is superimposed upon the mounting or base plate 22 for movement longitudinally thereof with the registering openings 66 and 68 in the retaining bar and body of the supporting plate respectively adapted to be selectively placed in register with the bore 76 of the block 72 and the registering openings 78 in the cross member 32, as the supporting plate 40 is slidably moved longitudinally of the mounting or base plate 22. This, of course, will carry the fifth wheel 62 therewith, so that the fifth wheel will also be moved longitudinally of the mounting or base plate 22 and the frame members 12 of the vehicle or trailer truck frame toward and away from the cab 14.

In order to retain or maintain the supporting plate 40 and the fifth wheel 62 carried thereon in a selected position longitudinally of the mounting or base plate 22 and the frame of the trailer truck, there is provided a locking means in the form of a cylindrical locking pin 80, one end of which is received in the bore 76 of the block 72, and which is adapted to enter through the registering opening 78 in the cross member 32 and thence into the openings 66 and 68 which have been selectively placed in register with the opening 32, so as to prevent longitudinal movement of the supporting plate relative to the mounting or base plate 22. The other end of the locking pin 80, remote from the end received in the bore 76, is disposed at a distance below the lower face of the block 72, and is provided with a flat longitudinally extending ear 82 having its free or terminal end formed arcuately and having an opening centrally therethrough adjacent the rounded or free end thereof. A link 84, and a similar link 86, have a pivotal engagement with the ear 82 adjacent one end of the respective links with each link disposed on opposite sides of the ear 82, the pivotal engagement provided by a pin 88 passing through registering openings in the respective ends of the links 84 and 86 and the end of the ear 82. The other ends of the links, which extend longitudinally from the ear 82, are provided with registering openings therethrough, so as to be pivotally mounted upon opposite sides of one arm 90 of a bell crank lever 92 as by a pin 94 passing through the aligned openings in the links 84 and 86, and a suitably aligned opening in the arm 94 adjacent the end thereof remote from the pivot 96 of the bell crank lever 90 defined by a pin passing through the fulcrum of the bell crank lever and through suitably aligned openings in a pair of spaced support plates 98 dependingly carried by the crossbar 32 of the mounting or base plate 22. An extension 91 is formed at the free end of the arm 90 and extends outwardly therefrom at an angle to the longitudinal axis thereof and provides a hook at its free end to receive and anchor one end 100 of a spring 102, the other end 104 of the spring being secured to a hook 106 carried by the lower face of the cross member 32. Thus, the spring 102 will extend angularly between the extension 91 of the bell crank lever 92 and the lower face of the cross member 32, since the hook 106 is disposed at a location spaced from the mid-point of the cross member 32 and to the side thereof remote from the side from which the support plates 98 depend, so that the spring 102 will normally urge the locking pin 80 upwardly through the bore 76 and registering opening 78 to enter a selected one of the registering openings 68 and 66 in the body 50 of the supporting plate 40 and the retaining bar 64 respectively.

The spring 102 will act through the arm 90 of the bell crank lever 92 and the links 84 connected to the tongue 82 of the locking pin to effect the resilient urging of the locking means or pin 80 upwardly through the registering openings, so as to prevent longitudinal movement of the supporting plate 40 relative to the mounting or base plate 22.

A bell crank lever 92, along with the links 84, is a part of the means selectively operable for releasing the locking means 80, that is, causing the locking means to move downwardly through the bore 76 of the block 72, to permit longitudinal movement of the supporting plate 40 slidably of the mounting plate 22.

In order to have the means for releasing the locking pin selectively operable, the other arm 93 of the bell crank lever 92 is pivotally connected adjacent its end remote from the lever pivot 92, as at 108, to one end of an operating rod 110. The other end of the operating rod 110 is operatively connected to the diaphragm of the vacuum operated valve, generally indicated at 112, carried on a supporting plate 114 dependingly carried by the lower face of the cross member 32 and spaced to the side of the support plate 98 remote from the centrally disposed guide bearing block 72. The support plate 114 may be reinforced by a triangular bracket 116 disposed at the juncture of the upper edge of the support plate 114 and the lower face of the cross member 32.

A hose connection 118 operatively connects an air hose 120 to the valve 112 at the side thereof remote from the side or end from which the operating rod 110 extends. The hose 120 is operatively connected to the vacuum system of the trailer truck 10, and also is selectively operable by a switch connected thereinto and mounted in the cab 14, preferably on the dashboard thereof, the connection of the air hose 120 to the vacuum system of the trailer truck 10 and to a manually operable switch mounted in the cab is accomplished in a well known manner, hence, not shown.

In operation, in order to vary the over-all length of the semitrailer unit comprising the trailer truck 10 and trailer 18 detachably coupled thereto upon the fifth wheel 62 between the limits as shown in Figure 1, wherein the fifth wheel construction 20 is shown in dotted lines in the most forward position, while the broken line showing is in the maximum rearward position, it is merely necessary to actuate the selectively operable means which includes the valve 112 so that the operating rod 110 will be moved to the left, as viewed in Figure 2, by the operation of the valve 12 which is so constructed and operable to cause this movement of the rod 110 upon actuation of the switch operatively connected thereto. Upon movement of the operating rod 110 to the left, the bell crank lever 92 will be rotated about its pivot 96 to the position shown in Figure 3, so that the links 84 will cause a downward pull upon the tongue 82 and cause the locking pin 80 to move downwardly in the bore 76 and be withdrawn from the registering openings 68 and 66, against the resilience of the spring 102.

With the locking means withdrawn from engagement with the slidably mounted supporting plate 40, the operator may move the trailer truck 10 relative to the coupled trailer 18 to thereby cause the supporting plate 40 to slide longitudinally of the mounting or base plate 22, which will, of course, carry the fifth wheel 62 therewith, to a selected position either at the maximum position wherein the fifth wheel construction 20 is disposed nearest the cab 14, as shown in full lines in Figure 1, or at the other maximum position wherein the fifth wheel construction is moved to the other extreme position, wherein it is disposed in the broken line position as shown in Figure 1, and farthest removed from the cab 14, or any of the positons intermediate the two extreme positions, as determined by the registering openings spaced longitudinally of the retaining bar 64 and the supporting plate 40 intermediate the two endmost registering openings therethrough. The switch or valve in the cab of the trailer truck may then be manually operated to release the operating rod 110, so that the spring 102 will cause the locking means 80 to move upwardly and the bell crank lever 92 to rock about its axis 96 and return to its initial position, as shown in Figure 3, whereby the locking means or pin 80 will again move upwardly through the block bore 76 through the registering opening 78 in the cross member 32 and into the selected one of the registering openings 68 and 66 to thereby lock the supporting plate 40 upon the mounting or base plate 22 to prevent sliding movement of the supporting plate 40 relative to the mounting plate.

A safety stop block 120 is secured on the upper face of each of the frame members 12 adjacent the end of the plate 22 remote from the end adjacent the cab 14 to prevent excessive movement of the supporting plate 40 in its rearward movement relative to the mounting or base plate 22, while a stop 122, in the form of a laterally extending leg of an L-shaped channel, is provided at the other end of each of the frame members 12 to similarly prevent movement of the supporting plate 40 beyond the maximum forward position, as shown in full lines in Figure 1.

Also, each of the corners of the supporting plate 40 is reinforced by an upstanding gusset or reinforcing plate 124. Each of the gussets or supporting plates 124 may be further provided with a reinforcing rib 126 extending centrally along the rear face thereof and secured to the adjoining edge of the supporting plate 40 adjacent the respective corner.

It will be seen that the supporting plate 40 has a plurality of longitudinally spaced openings 68 therethrough, while the retaining bar 64 also has a plurality of longitudinally spaced openings therethrough which are in register with the openings 68, the locking means including a locking pin carried by the mounting plate 22 and engageable with a selected one of the registering openings in the supporting plate and retaining bar for preventing sliding movement of the supporting plate, and means which include the links 84, bell crank lever 92, operating rod 110, and the diaphragm valve 112, which is selectively operable for withdrawing the locking pin 80 from its engagement with the selected one of the registering openings in the supporting plate and retaining bar secured thereon to permit the supporting plate to slide longitudinally of the mounting plate 22. Further, there has been provided spring means in the form of the spring 102 which is operatively connected to the locking pin through the extension 91 on the arm 90 of the bell crank 92 and the links 84 to the locking pin 80 to urge the pin into engagement with the selected one of the registering openings in the supporting plate and retaining bar, the spring means offering resilient opposition to the means selectively operable for the withdrawal of the locking pin from engagement with the selected one of the registering openings in the supporting plate and retaining bar.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In a trailer truck having a frame extending over the rear wheels thereof, a fifth wheel structure mounted on the extending portion of said frame, said structure comprising a mounting plate fixedly carried by said frame across the top thereof, a supporting plate carrying a fifth wheel thereon superimposed upon said mounting plate and mounted on said mounting plate for sliding movement longitudinally thereof, said supporting plate having a plurality of longitudinally spaced openings therethrough located substantially along the longitudinal center line of said frame, a retaining bar having a plurality of longitudinally spaced openings therethrough secured on and extending longitudinally of said supporting plate with said openings therein in register with said openings in said supporting plate, locking means including a locking pin carried by said mounting plate and engageable with a selected one of the registering openings in said supporting plate and retaining bar for preventing sliding movement of said supporting plate, and means selectively operable for withdrawing said locking pin from engagement with said selected one of said registering openings to permit said supporting plate to slide longitudinally of said mounting plate.

2. In a trailer truck having a frame extending over the rear wheels thereof, a fifth wheel structure mounted on the extending portion of said frame, said structure comprising a mounting plate fixedly carried by said frame across the top thereof, a supporting plate carrying a fifth wheel thereon superimposed upon said mounting plate and mounted on said mounting plate for sliding movement longitudinally thereof, said supporting plate having a plurality of longitudinally spaced openings therethrough located substantially along the longitudinal center line of said frame, a retaining bar having a plurality of longitudinally spaced openings therethrough secured on and extending longitudinally of said supporting plate with said openings therein in register with said openings in said supporting plate, locking means including a locking pin carried by said mounting plate and engageable with a selected one of the registering openings in said supporting plate and retaining bar for preventing sliding movement of said supporting plate, and means selectively operable for withdrawing said locking pin from engagement with said selected one of said registering openings to permit said supporting plate to slide longitudinally of said mounting plate, and spring means operatively connected to said locking pin to urge said pin into engagement with said selected one of the registering openings, said means for withdrawing said pin operable against the resilience of said spring means.

3. In a trailer truck having a frame extending over the rear wheels thereof, a fifth wheel structure mounted on the extending portion of said frame, said structure comprising a mounting plate carried by said frame across the top thereof, a supporting plate carrying a fifth wheel thereon superimposed upon said mounting plate and mounted on said plate for sliding movement longitudinally thereof, said supporting plate having a plurality of longitudinally spaced openings therethrough located substantially along the longitudinal center line of said frame, a retaining bar having a plurality of longitudinally spaced openings therethrough secured on and extending longitudinally of said supporting plate with said openings therein in register with said openings in said supporting plate, locking pin carried by said mounting plate and engageable with selected ones of the registering openings in said supporting plate and retaining bar for preventing sliding movement of said supporting plate, and means selectively operable for withdrawing said locking pin from engagement with said selected registering openings to permit the said supporting plate to slide longitudinally of said mounting plate, guide rails carried by said supportng plate in overlying operative relation to said mounting plate for guiding said supporting plate in its slidable movement relative to said mounting plate.

4. In a trailer truck having a frame extending over the rear wheels thereof, a fifth wheel structure mounted on the extending portion of said frame, said structure comprising a mounting plate carried by said frame across the top thereof, a supporting plate carrying a fifth wheel thereon superimposed upon said mounting plate and mounted on said plate for sliding movement longitudinally thereof, said supporting plate having a plurality of longitudinally spaced openings therethrough located substantially along the longitudinal center line of said frame, a retaining bar having a plurality of longitudinally spaced openings therethrough secured on and extending longitudinally of said supporting plate with said openings therein in register with said openings in said supporting plate, locking means including a locking pin carried by said mounting plate and engageable with selected ones of the registering opening in said supporting plate and retaining bar for preventing sliding movement of said supporting plate, and means selectively operable for withdrawing said locking pin from engagement with said selected registering openings to permit the said supporting plate to slide longitudinally of said mounting plate, guide rails carried by said supporting plate in overlying operative relation to said mounting plate for guiding said supporting plate in its slidable movement relative to said mounting plate, and stops carried on the extending portion of the frame adjacent opposite ends thereof and adjacent opposite ends of said mounting plate in the path of movement of said supporting plate to limit the sliding movement thereof beyond the desired maximum movement in either direction.

5. In a trailer truck having a frame extending over the rear wheels thereof, a fifth wheel structure mounted on the extending portion of said frame, said structure comprising a mounting plate carried by said frame across the top thereof, a supporting plate carrying a fifth wheel thereon superimposed upon said mounting plate and mounted on said plate for sliding movement longitudinally thereof, said supporting plate having a plurality of longitudinally spaced openings therethrough located substantially along the longitudinal center line of said frame, a retaining bar having a plurality of longitudinally spaced openings therethrough secured on and extending longitudinally of said supporting plate with said openings therein in register with said openings in said supporting plate, locking means including a locking pin carried by said mounting plate and engageable with selected ones of the registering openings in said supporting plate and retaining bar for preventing sliding movement of said supporting plate, and means selectively operable for withdrawing said locking pin from engagement with said selected registering openings to permit the said supporting plate to slide longitudinally of said mounting plate, and stops carried on the extending portion of the frame adjacent opposite ends thereof and adjacent opposite ends of said mounting plate in the path of movement of said supporting plate to limit the sliding movement thereof beyond the desired maximum movement in either direction.

References Cited in the file of this patent

UNITED STATES PATENTS

| | | |
|---|---|---|
| Re. 23,704 | DeLay | Sept. 1, 1953 |
| 2,317,508 | Zoder | Apr. 27, 1943 |
| 2,468,705 | Price | Apr. 26, 1949 |
| 2,713,500 | Flynn | July 19, 1955 |